United States Patent Office 2,939,352
Patented June 7, 1960

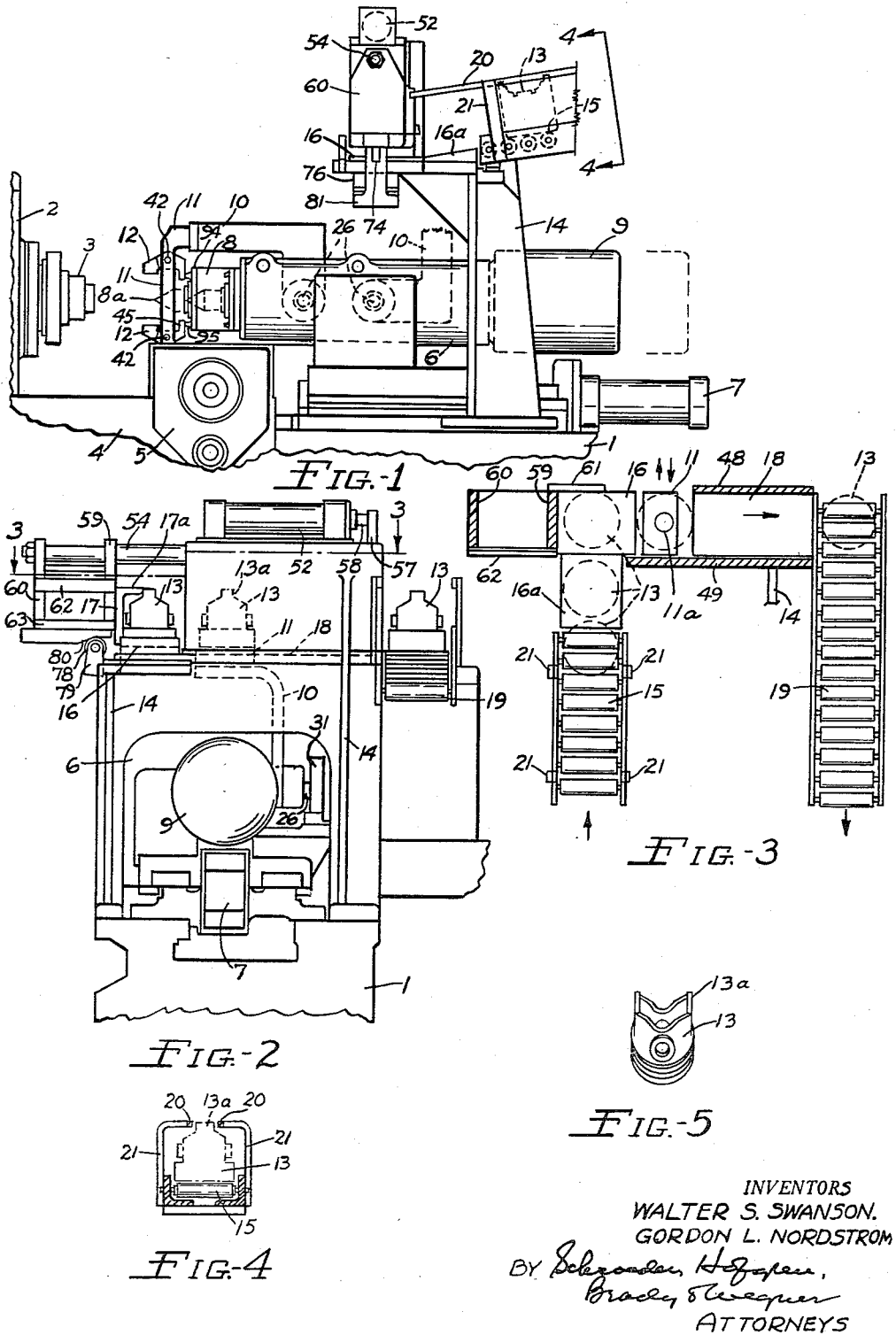

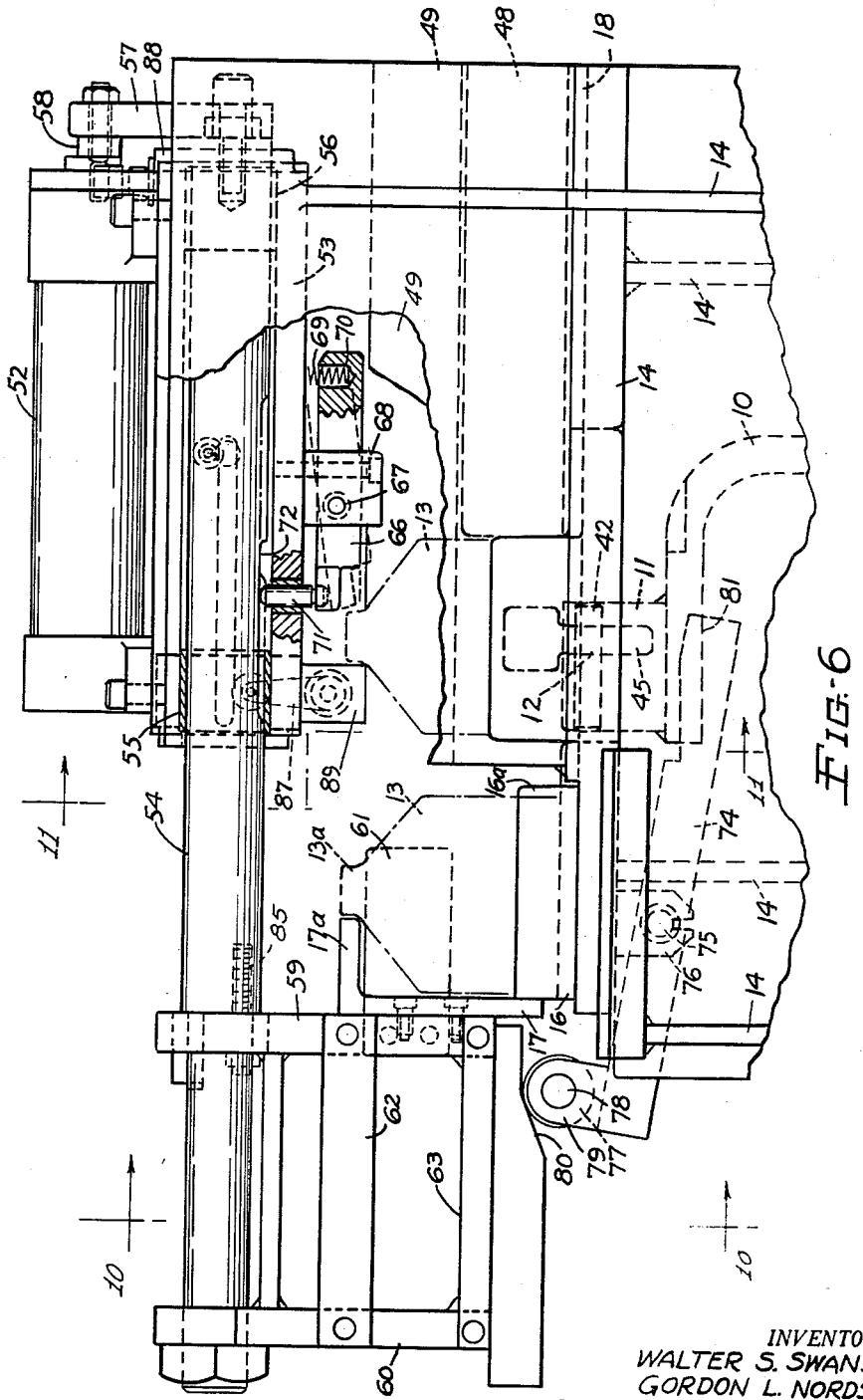

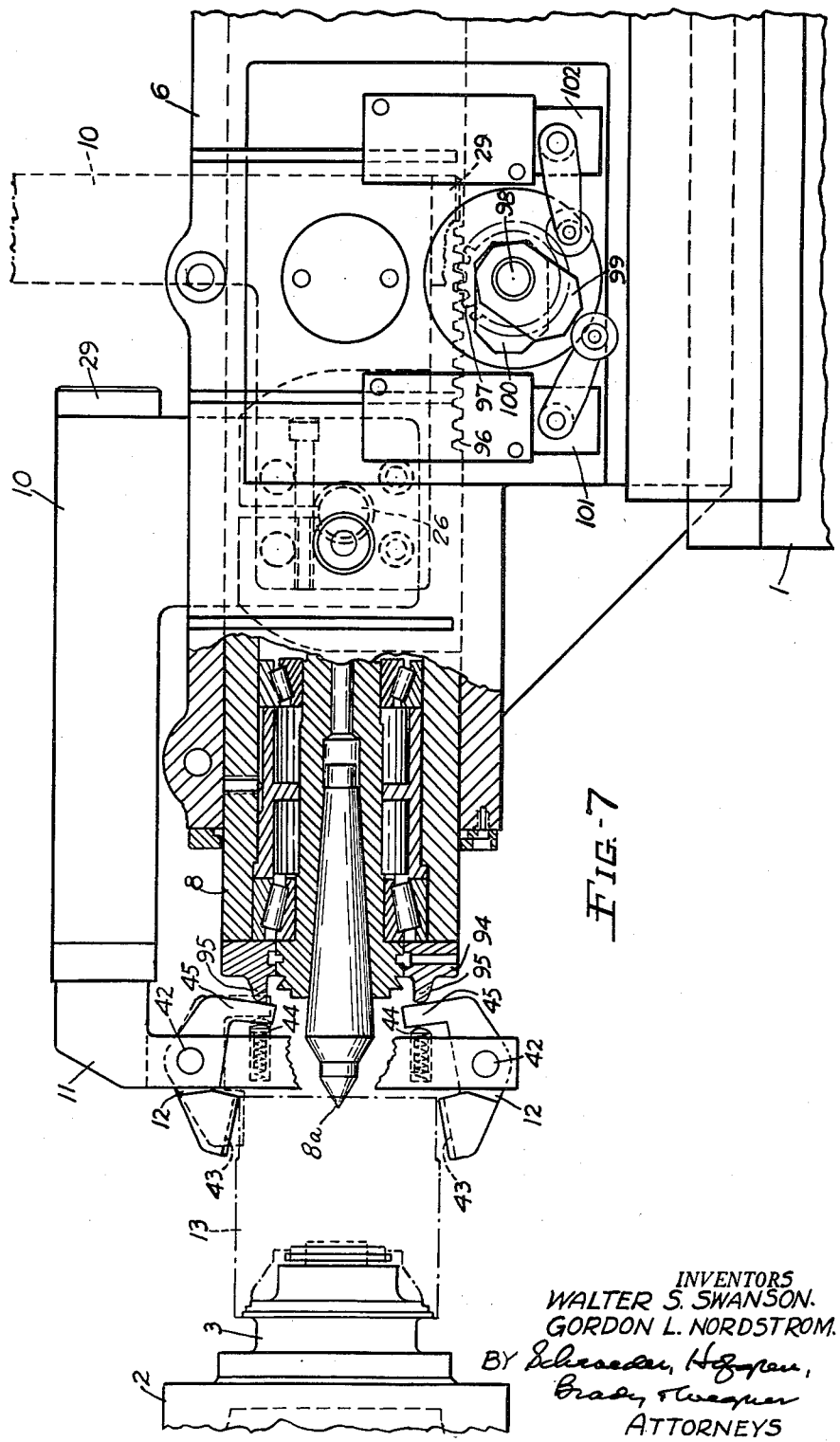

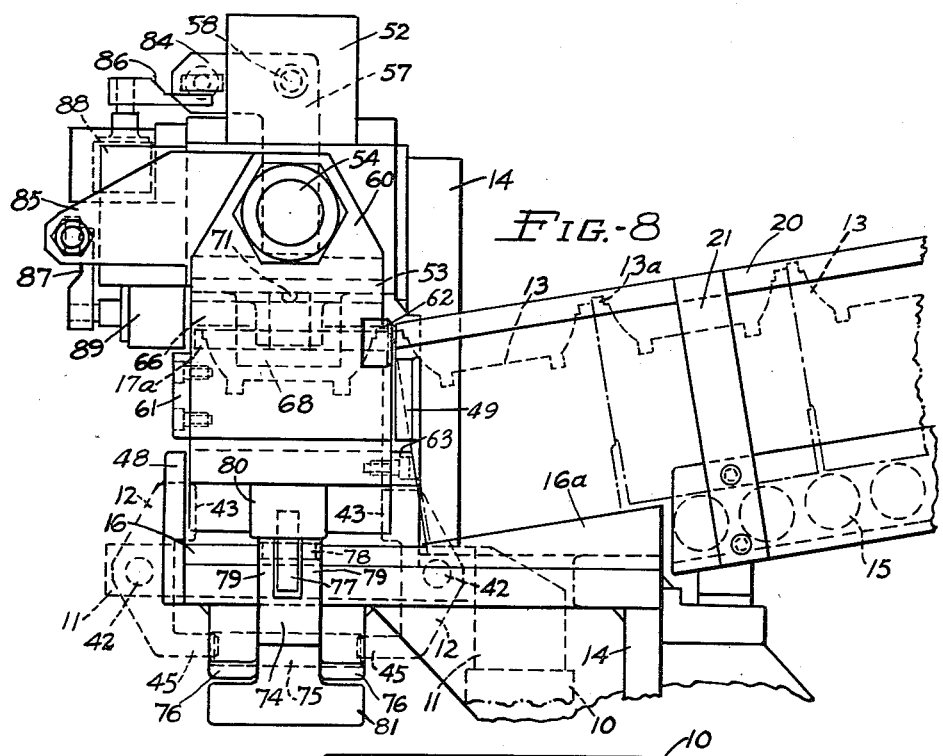
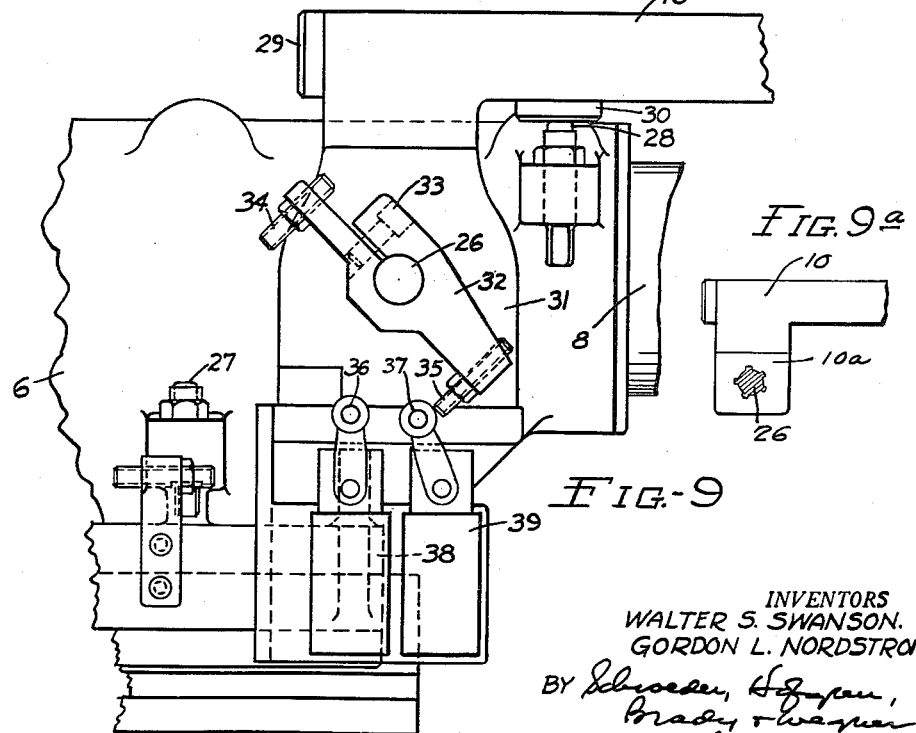

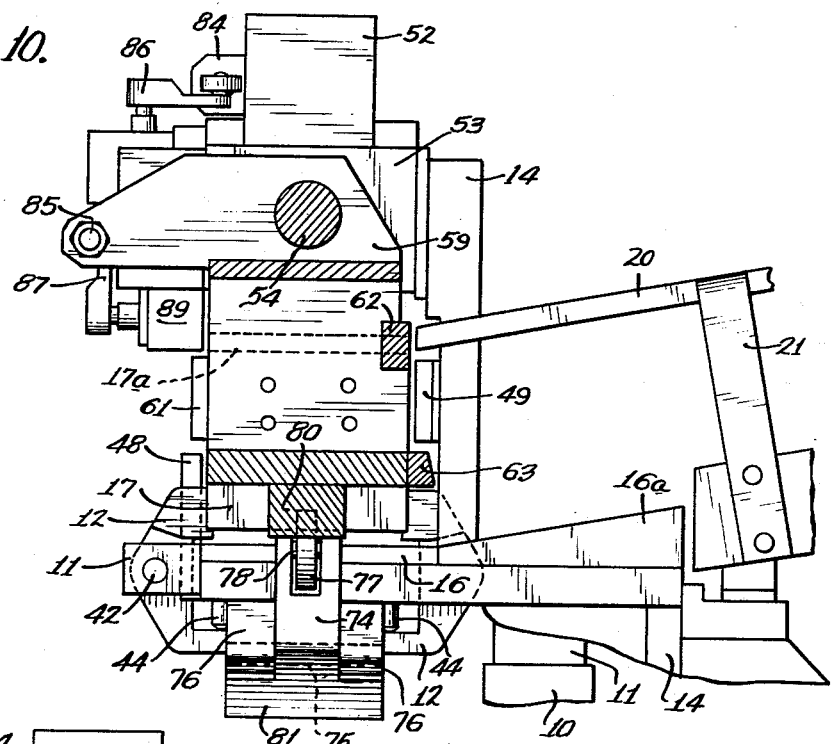

2,939,352
WORK LOADING LATHE

Walter S. Swanson and Gordon L. Nordstrom, Rockford, Ill., assignors to Sundstrand Corporation, a corporation of Illinois Filed Dec. 20, 1954, Ser. No. 476,146

1 Claim. (Cl. 82—2.7)

This invention relates to a work loading lathe, and more particularly to a work loading lathe for use with workpieces that must be machined in a horizontal position after being advanced to the lathe in a vertical position.

The general object of this invention is to provide a new and improved work loading lathe of the character described, for taking workpieces directly from a conveyor system, performing a machining operation and returning the finished workpieces to the conveyor system.

A further object of this invention is to provide a new and improved work loading lathe of the character described, which positions workpieces in a lathe by receiving a vertically standing workpiece from a first conveyor, pushing it onto a loading arm which then swings the workpiece downwardly in a vertical arc into a horizontal position in line with a headstock workdriver where it is machined, and then returns the finished workpiece to its initial vertical position where it is pushed onto a second, unloading conveyor.

Another object of this invention is to provide a new and improved work loading lathe of the character described for use with workpieces which, though essentially cylindrical in shape, are not adapted, because of their over-all shape, to be rolled into position where they may easily be gripped around their outer circumference and swung or rotated, generally transversely to the axis of the lathe, into position between the lathe centers, the workpieces in this invention being fed to the lathe on one end, in which position they are clamped from the bottom to an arm which is then pivoted through an arc in a vertical plane to position the workpiece horizontally between the lathe centers for the machining operation.

Another object of this invention is to provide a new and improved work loading lathe, of the character described, having a loading arm pivotally mounted on one side of the tailstock and movable through an arcuate path in a vertical plane between a vertical position and a horizontal position, a pusher member for advancing a vertically standing workpiece from a conveyor onto the loading arm in its vertical position, spring-urged fingers on the loading arm for gripping the workpiece so that the loading arm and workpiece may be pivoted into a horizontal position for the machining operation and then returned to the vertical position where the finished workpiece is pushed to a return conveyor by the next workpiece advanced onto the loading arm by the pusher member, and means for unclamping the gripping fingers from the workpieec during the machining operation and during the operation of the pusher member.

Yet a further object of the invention is to provide a new and improved work loading lathe of the character described, in which a cylindrical workpiece standing on end is positioned on a vertically disposed loading arm pivotally mounted on the tailstock of the lathe, the loading arm then being pivoted downwardly until the workpiece is horizontally positioned between the lathe centers, the tailstock and quill then being advanced to position the workpiece on the centers so that the workpiece may be rotated during a machining operation, after the machining operation the tailstock and quill being retracted and the loading arm then being pivoted upwardly to its vertical position where the workpiece may be removed.

Other objects and advantages will become apparent from the following detailed description taken in connection with the accompanying drawings, in which:

Fig. 1 is a fragmentary front elevation of a lathe utilizing this invention;

Fig. 2 is a right end elevation of the lathe and loading mechanism as shown in Fig. 1;

Fig. 3 is a fragmentary plan elevation taken along line 3—3 of Fig. 2 with parts omitted and illustrates the movement of workpieces, shown in dotted line, through the conveyor system;

Fig. 4 is an end section view of the loading conveyor taken along line 4—4 of Fig. 1;

Fig. 5 is a perspective view of a typical workpiece used with this lathe;

Fig. 6 is an enlarged partial end elevational view partially broken away to show the details of the pusher member operation;

Fig. 7 is an enlarged partial front elevational view showing the loading arm in its horizontal position and partially broken away to better show the details of the tailstock and quill;

Fig. 8 is an enlarged fragmentary front view showing workpieces positioned on the loading conveyor;

Fig. 9 is an enlarged fragmentary rear elevational view showing the mounting of the loading arm on the tailstock and the limits of its movement;

Fig. 9a is a diagrammatic illustration of the connection between the loading arm and shaft which actuates the arm;

Fig. 10 is a fragmentary vertical section on an enlarged scale taken generally along the line 10—10 in Fig. 6; and Fig. 11 is a fragmentary vertical section on an enlarged scale taken generally along the line 11—11 in Fig. 6.

While the invention herein described is a preferred embodiment, it is not intended to limit the invention to the specific form and arrangements shown, it being contemplated that various changes may be made by those skilled in the art without departing from the spirit and scope of the appended claims.

Referring now to Figs. 1 and 2, the lathe includes a lathe bed 1, a headstock 2 mounted on the bed 1 and provided with a work-driving spindle 3, a carriage 4 and a cross slide 5, all of which are conventional in a lathe. A tailstock 6 is slidably mounted on ways on the lathe bed 1, the tailstock 6 being movable through the action of a hydraulic cylinder and piston means 7. Tailstock 6 carries a quill 8 which is slidable within tailstock 6 through the action of an air cylinder and piston means 9. The approximate limits of movement of tailstock 6 and quill 8 are shown by broken lines in Fig. 1.

An angular loading arm 10 is pivotably mounted on the rear side of tailstock 6 and is movable in an arcuate path in a vertical plane between a vertical and a horizontal position. Secured to the free end of loading arm 10 is a mounting bar 11 with a central aperture 11a which in the vertical position of loading arm 10 forms a horizontal workpiece supporting structure. Mounting bar 11 carries a pair of fingers or jaws 12 which are operable to clamp a workpiece 13 to the mounting bar 11 so that the loading arm 10 may be pivoted downwardly to its horizontal position adjacent the quill 8 whereby the workpiece 13 clamped therein is horizontally positioned in alignment with the work-driving spindle 3. The workpiece 13 then being clamped on the work-driving spindle 3 and released from the mounting bar 11 by the movements respectively of the tailstock 6 and the quill 8.

The structure provided to transfer a workpiece 13 from a master conveyor (not shown) to the mounting bar 11 when loading arm 10 is in its vertical position is disposed generally above the tailstock 6 and is supported by a suitable supporting structure, designated generally as 14, which is secured to the lathe bed 1. Included in this structure is an inclined loading conveyor 15 down which the vertically standing workpieces 13 slide after being transferred from the master conveyor. At the lower end of conveyor 15 is a skidplate 16 upon which the workpieces 13 are deposited from conveyor 15. A pusher member 17 is hydraulically moved along skidplate 16 in a direction transverse to the direction of movement of workpieces 13 on conveyor 15. Pusher member 17 moves one workpiece 13 at a time along skidplate 16 and onto mounting bar 11 which forms a continuation of skidplate 16 when loading arm 10 is in its vertical position. Means described hereinafter are provided for positioning the workpiece 13 on mounting bar 11 and for controlling the clamping fingers 12, said means being actuated by the movement of pusher member 17. After the workpiece 13 has been clamped to mounting bar 11, loading arm 10 is pivoted downwardly into its horizontal position where the workpiece 13 is clamped onto the work-driving spindle 3 and released from the mounting bar 11 by the respective movements of tailstock 6 and quill 8. The workpiece 13 is then machined, after which it is reclamped to mounting bar 11, loading arm 10 then being pivoted back to its vertical position. The movement of a second workpiece 13 onto mounting bar 11 by pusher member 17 pushes the finished workpiece 13 onto a second skidplate 18 and eventually onto a second inclined conveyor 19 down which the finished workpieces 13 slide onto a master conveyor (not shown). The basic movements of a workpiece 13, such as a piston, shown in Fig. 5, are best shown in Fig. 3, the different positions of a workpiece 13 being shown by broken lines.

Because of the nature of the workpiece 13, Fig. 5, it is important that it be properly positioned so that it will fit on the work-driving spindle 3. The spindle of this lathe may stop in any position after a machining operation, and means (not shown) are provided to reposition the work-driving spindle 3 for receiving the workpiece 13. Thus, as best seen in Fig. 4, the workpieces 13 on conveyor 15 are prevented from rotating by means of a pair of parallel spaced members 20 which are carried by members 21 secured to the sides of conveyor 15. Members 20 are spaced to only allow the passage therethrough of the narrowest portion 13a, Fig. 5, of the skirt of piston 13, thus preventing any rotation of the workpieces 13 while on conveyor 15.

The invention will now be described in more detail with reference being made to the enlarged detailed figures. As best seen in Figs. 2 and 9, the loading arm 10 is pivotally fastened adjacent the rear side of tailstock 6 by means of a shaft 26, the loading arm 10 being pivotable between a horizontal position and a vertical position (shown in broken line in Figs. 1 and 7) in an arcuate path in a vertical plane. The limits of movement of arm 10 are determined by adjustable positive stop members 27 and 28 secured to tailstock 6 which are engageable respectively with hardened projections 29 and 30 on loading arm 10. As seen in Fig. 2, a vane-type rotary hydromotor 31 has the shaft 26 as a rotatable output shaft splined to an enlargement 10a on the arm 10 as diagrammatically illustrated in Fig. 9a for moving the loading arm 10. A member 32 securely tightened on shaft 26 by means of a screw 33 carries two dogs 34 and 35 operable to contact members 36 and 37 on switches 38 and 39, respectively. Switches 38 and 39 may be connected in a suitable circuit (not shown) adapted to respectively control the pusher member 17 actuating means and the tailstock 6 actuating means.

As best seen in Figs. 7 and 11, the mounting bar 11 is secured to the free end of loading arm 10. In the vertical position of loading arm 10, the mounting bar 11 is in a horizontal plane and adapted to receive a workpiece 13 thereon. In order to secure the workpiece 13 to the mounting bar 11, a pair of jaws or fingers 12 are pivotably mounted thereon. Fingers 12 extend through slots in mounting bar 11 and are rotatable on pins 42 fixed in the slots. One end of each finger 12 has an arcuate surface 43 adapted to fit tightly against the peripheral surface of the workpiece 13, the two fingers acting together to clamp the workpiece 13 to the mounting bar 11. The fingers 12 are normally held in a clamping position by means of spring-urged pins 44 positioned in the mounting bar 11 so as to exert a force against inwardly-extending flanges 45 formed on the other end of the fingers 12. Any force exerted against the flanges 45 greater than and opposing the force of spring-urged pins 44 will thus release the fingers 12 from clamping engagement with a workpiece 13. In Fig. 7 the fingers 12 are shown in an unclamped or released condition with the spring-urged pins 44 being in a compressed condition. The upper finger 12 is shown in a clamping position by means of dotted lines.

The structure supported above the tailstock 6 on supporting structure 14 is best shown in Figs. 1 to 4, 6, 8, 10 and 11. Adjacent to the lower end of the conveyor 15 is a generally horizontal skidplate 16 which has an inclined portion 16a immediately adjacent conveyor 15. Spaced from skidplate 16 in an end-to-end arrangement is a second horizontal skidplate 18. Associated with skidplate 18 are vertical side guide members 48 and 49, Fig. 3. When loading arm 10 is in its vertical position, mounting bar 11 is positioned between skidplates 16 and 18 so as to provide a connecting supporting structure for the workpieces 13.

Means are provided for advancing or pushing the workpieces along the skidplate 16 onto mounting bar 11, and after the machining operation from mounting bar 11 onto skidplate 18 and eventually onto unloading roller conveyor 19. Included in the workpiece advancing means are the pusher member 17, a hydraulic cylinder and piston actuating means 52 and connecting members described presently. As best seen in Fig. 6 and also shown in Figs. 2 and 8, hydraulic actuating means 52 is carried on supporting structure 14 and has disposed beneath it a casing 53 in which a rod 54 is slidably supported by two bushings 55 and 56. A connecting link 57 is secured at one end to rod 54 and at the other end to a piston rod 58 associated with cylinder and piston means 52 so that on movement of piston rod 58 movement is imparted to rod 54. Carried on the other end of rod 54 are two spaced downwardly-extending plates 59 and 60. The pusher member 17 is secured to plate 59 and has an extending flange portion 17a thereon adapted to abut against the two narrow skirt portions 13a of workpiece 13 so that the workpiece 13 is prevented from rotating as it is pushed onto mounting bar 11 when hydraulic means 52 is actuated.

Also secured to plate 59, along the edge furthest from loading conveyor 15, is a plate 61 which extends in the direction of travel of pusher member 17 and acts as a stop for workpieces 13 moving onto skidplate 16 from conveyor 15 into position to be advanced onto mounting bar 11 by pusher plate 17.

To prevent the movement of a second workpiece 13 onto skidplate 16 when pusher member 17 is in its advanced position, two hold back bars 62 and 63 are secured between plates 59 and 60 immediately adjacent conveyor 15. Thus, a second workpiece 13 is retained on inclined portion 16a of skidplate 16 until the pusher member 17 is returned to its initial position after pushing a workpiece 13 into position on mounting bar 11.

To prevent over-travel of a workpiece 13 on mounting bar 11 an end stop 66 is provided. End stop 66 is pivotably mounted on a rod 67 carried on a member 68 secured to the lower portion of rod casing 53. End stop 66 is normally pivoted out of blocking position by a spring 69 received in a recess 70 in one end of end stop 66 and bearing against rod casing 53. To rock end stop 66 into blocking position, a pin 71 is slidably mounted in a vertical bore in rod casing 53. The lower end of pin 71 rests against the end of end stop 66 opposite the spring urged end and the upper end of pin 71 is in engagement with a cam surface 72 on rod 54. Thus, as the pusher member 17 is advancing a workpiece 13 onto loading arm 10, pin 71 is forced downwardly against end stop 66, pivoting end stop 66 into blocking engagement with the workpiece 13 so as to properly position the workpiece 13 on mounting bar 11.

Means must also be provided for releasing clamping fingers 12 so that a workpiece 13 may be advanced onto mounting bar 11 between fingers 12. In the embodiment of the invention illustrated herein, the fingers 12 are released by a cam and lever means. As seen in Figs. 6 and 8, a member 74 is pivotably mounted on a shaft 75 secured in brackets 76 which are mounted on supporting structure 14. A cylindrical disc 77 is rotatably supported on a pin 78 which is secured between two ears 79 at one end of member 74. Disc 77 is in continuous engagement with a cam bar 80 secured to the bottom edges of plates 59 and 60. The other end of member 74 has an enlarged portion 81 adapted when pivoted upwardly due to the effect of cam bar 80 on disc 77 to engage flanged portions 45 of clamping fingers 12 to release fingers 12. Thus, as a workpiece 13 is pushed toward mounting bar 11, fingers 12 are pivoted into a released condition allowing the positioning of a workpiece 13 on mounting bar 11. Then as pusher member 17 is returned to its initial position, member 74 is disengaged from fingers 12 allowing them to grip the workpiece 13 to clamp it to mounting bar 11 on loading arm 10. Simultaneously, as pusher member 17 is returned to its initial position, end stop 66 is allowed to pivot into its normal non-blocking position and hold back bars 62 and 63 are retracted to permit a second workpiece 13 on conveyor 15 to move into loading position on skidplate 16 adjacent to pusher member 17 and against stop plate 61.

As best shown in Figs. 8 and 10, a projection 84 on connecting link 57 and an enlonged member 85 fastened to plate 59 are operable respectively to contact members 86 and 87 on switches 88 and 89. Switches 88 and 89 may be connected in a suitable circuit (not shown) adapted to respectively control hydromotor 31 and cylinder and piston means 52.

After the workpiece 13 has been clamped to mounting bar 11, loading arm 10 is pivoted into its horizontal position, in which position the workpiece 13 is in horizontal alignment with the work-driving spindle 3. Then the tailstock 6, which is slidably mounted on ways on lathe bed 1, is advanced toward the headstock 2 by means of the hydraulic cylinder and piston means 7 to push the workpiece 13 onto a projecting portion of the work-driving spindle 3. The tailstock quill 8, which is slidably mounted in the tailstock 6, is then independently advanced further towards the headstock 2 so that a tail center 8a carried on the quill 8 may pass through the aperture 11a and pick up the center of the workpiece 13 and clamp the workpiece 13 to the work-driving spindle 3. Referring to Fig. 7, an end annular ring 94 on the tailstock quill 8 is provided with two projections 95 which are positioned to engage flanged portions 45 of fingers 12, and on movement of the quill 8 are operable to disengage the fingers 12 from the workpiece 13. The workpiece 13 is then free to be rotated on the work-driving spindle 3 during the machining operation. The movement of the tailstock quill 8 is provided by the air cylinder and piston means 9. A rack 96 integral with the quill 8 is in operable engagement with a gear 97 secured to a shaft 98. Upon longitudinal movement of quill 8, shaft 98 is rotated, causing dogs 99 and 100, secured thereto, to actuate switches 101 and 102, which may be connected in a suitable circuit (not shown) adapted to control respectively the spindle and the tailstock retracting means 7.

After the completion of the machining operation the tailstock quill 8 is first retracted, allowing fingers 12 to again clamp workpiece 13 to the mounting bar 11 on loading arm 10. The tailstock 6 and loading arm 10 are then retracted, pulling the finished workpiece 13 which is now clamped to the mounting bar 11 off of work-driving spindle 3. Loading arm 10 is then pivoted upwardly into its vertical position, returning the workpiece 13 to its initial vertical position.

When the cylinder and piston means 52 is again actuated by the upward movement of the arm 10, the movement of a second workpiece 13 toward the mounting bar 11 of loading arm 10 causes the fingers 12 to be unclamped, as before described, so that the second workpiece 13 in being pushed onto mounting bar 11 pushes the finished workpiece 13 onto skidplate 18, end stop 66 not being pivoted into blocking position until the finished workpiece 13 has been pushed beyond it. The finished workpieces 13 are eventually pushed onto downwardly inclined roller conveyor 19, upon which they move to a discharge bin or to a master conveyor (not shown).

In the operation of this device, a generally cylindrical workpiece 13 moves down a conveyor 15 upon which it is supported in a vertical position, and which has means for preventing rotational displacement of the workpiece 13, onto a skidplate 16. The workpiece 13 is then pushed onto the mounting bar 11 of loading arm 10 by pusher member 17 and clamped thereto by fingers 12. A hydromotor 31 then pivots loading arm 10 until the workpiece 13 is horizontally aligned with work-driving spindle 3. Movement of the tailstock 6 and quill 8, respectively, clamps the workpiece 13 to the work-driving spindle 3 and releases the workpiece 13 from mounting bar 11 so that the workpiece 13 is free to be rotated during the machining operation. After the machining operation, the workpiece 13 is then reclamped to mounting bar 11 on loading arm 10 and pivoted back to its original vertical position, where it is unclamped and pushed onto a discharge conveyor 19 by the movement of a second workpiece 13 onto mounting bar 11.

We claim:

A work loading mechanism for a lathe having a tailstock with a movable quill carrying a tail center, a machining station in which a workpiece is positioned with its axis concentric with said tail center, a horizontal skidplate mounted generally above the tailstock, said skidplate being positioned transverse of the axis of the tailstock and having a substantial gap therein, a conveyor for transferring workpieces supported on end to said skidplate, a loading arm pivotally mounted on the tailstock and movable in an arc in a vertical plane between a horizontal position and a vertical position, a mounting bar fastened to one end of said loading arm, said mounting bar in the vertical position of said loading arm being positioned in the gap in said skidplate so as to form a subtsantially continuous supporting surface for the workpieces, releasable means on said mounting bar for gripping a workpiece positioned thereon, means for advancing a workpiece from said skidplate onto said mounting bar, means for pivoting said loading arm to a horizontal position, means for moving the tailstock to advance the tailstock and loading arm to a machining station, and projections on the quill adapted upon movement of the quill outwardly of the tailstock to release said workpiece gripping means to allow rotatable support of the workpiece by the tail center during a machining operation.

References Cited in the file of this patent

UNITED STATES PATENTS

| | | |
|---|---|---|
| 1,112,539 | Landis | Oct. 6, 1914 |
| 1,350,715 | Foster et al. | Aug. 24, 1920 |
| 1,516,146 | Buckingham | Nov. 18, 1924 |
| 1,933,225 | Smith | Oct. 31, 1933 |
| 1,933,226 | Smith et al. | Oct. 31, 1933 |
| 2,264,160 | Flygare et al. | Nov. 25, 1941 |
| 2,570,660 | Gamble | Oct. 9, 1951 |
| 2,807,973 | Meyer | Oct. 1, 1957 |